United States Patent [19]

Bankmann et al.

[11] Patent Number: 5,591,873
[45] Date of Patent: Jan. 7, 1997

[54] FORMED COPPER CATALYST FOR THE SELECTIVE HYDROGENATION OF FURFURAL TO FURFURYL ALCOHOL

[75] Inventors: Martin Bankmann, Gelnhausen; Johannes Ohmer, Gruendau; Thomas Tacke, Friedrichsdorf, all of Germany

[73] Assignee: Degussa Aktiengesellschaft, Frankfurt am Main, Germany

[21] Appl. No.: 381,518

[22] Filed: Feb. 1, 1995

[30] Foreign Application Priority Data

Feb. 2, 1994 [DE] Germany .................. 44 03 187.4

[51] Int. Cl.⁶ .................. C07D 307/44; B01J 23/72
[52] U.S. Cl. .................. 549/503; 502/244
[58] Field of Search .................. 549/503; 502/244

[56] References Cited

U.S. PATENT DOCUMENTS

| | | | |
|---|---|---|---|
| 2,754,304 | 7/1956 | Swadesh | 260/347.8 |
| 4,185,022 | 1/1980 | Kozinski | 260/347.8 |
| 4,221,768 | 9/1980 | Inoue et al. | 423/239 |
| 4,261,905 | 4/1981 | Preobrazhenskaya et al. | 260/347.8 |
| 5,407,886 | 4/1995 | Schneider et al. | 502/244 |

FOREIGN PATENT DOCUMENTS

| | | |
|---|---|---|
| 0020048 | 12/1980 | European Pat. Off. . |
| 0393356 | 10/1990 | European Pat. Off. . |
| 3912504 | 10/1990 | Germany . |
| 4142897 | 6/1993 | Germany . |

Primary Examiner—Bernard Dentz
Attorney, Agent, or Firm—Beveridge, DeGrandi, Weilacher & Young, L.L.P.

[57] ABSTRACT

A formed copper catalyst for the hydrogenation of organic compounds is disclosed, especially for the selective hydrogenation of furfural to furfuryl alcohol. The catalyst contains an intimate mixture of a pyrogenic silica, reduced copper and, optionally, a basic oxide as promotor. The catalyst is distinguished by a high specific catalytic activity, selectivities and yields.

24 Claims, 2 Drawing Sheets

FORMED COPPER CATALYST FOR THE SELECTIVE HYDROGENATION OF FURFURAL TO FURFURYL ALCOHOL

INTRODUCTION AND BACKGROUND

The present invention relates to a formed copper catalyst for the selective hydrogenation of furfural to furfuryl alcohol and more particularly to a shaped catalyst containing an intimate mixture of reduced copper and a high-surface carrier material.

Furfuryl alcohol is an important selective solvent and is used as an initial starting material for the production of adhesives, paints and coatings. It is obtained by the catalytic hydrogenation of furfural.

The hydrogenation is carried out on an industrial scale either in the gaseous phase or in the liquid phase on a fixed-bed reactor. The conversion, yield and selectivity of this reaction are quite dependent on the process conditions selected and on the purity of the furfural. Superelevated reaction temperatures can result in undesired side products such as e.g. 2-methyl furane, tetrahydrofurfuryl alcohol and ethers by ring cleavage. Low-grade furfural used as the starting material can contain rather high amounts of acetic acid and sulfur, which result in a premature poisoning of the catalyst.

Suitable catalysts for the hydrogenation of furfural are copper chromite catalysts, Raney Ni, Raney Co and Raney Cu catalysts as well as copper catalysts promoted with sodium silicates.

U.S. Pat. No. 2,754,304 describes a catalyst for the gaseous-phase hydrogenation of furfural to furfuryl alcohol. The catalyst consists essentially of reduced copper promoted with a rather low amount of sodium silicate. It is produced by mixing copper(II) oxide with 5 to 20% by weight sodium silicate, forming this mixture into tablets and by subsequently reducing the copper(II) oxide to metallic copper. Heated hydrogen gas is passed over the catalyst tablets for the reduction. Conversions of over 99% are obtained with this catalyst in the gaseous-phase hydrogenation of furfural.

U.S. Pat. No. 4,185,022 describes a further development of this catalyst. It consists of a neutral or alkaline, inorganic carrier material with a specific surface of at least 60 $m^2/g$ prior to the deposition of a copper/sodium silicate component onto this carrier. The copper/sodium silicate component consists of 5–20% by weight sodium silicate. The finished catalyst contains at least 8 but not more than 25% reduced copper. Pumice, silica gel, quartz and neutral aluminum oxide are cited as suitable carrier materials. Pumice is the preferred carrier.

German Offenlegungsschrift DE 41 42 897 A1 corresponding to U.S. Pat. No. 5,407,886 describes porous catalytic formed bodies containing a metal of the iron group and/or copper on a carrier consisting of oxide or silicate, especially of pyrogenic silica.

The metal content of the formed bodies is 5 to 40% by weight relative to their total weight. The metal crystallites on the carrier exhibit a size of $\leq 3$ nm. This small size of the metal crystallites is assured by a special production process wherein precursor compounds of the metals are deposited by a hydrolysis precipitation in a suspension of the powdery carrier material on the carrier material. After shaping of the powdery carrier material into formed bodies the latter are calcined at temperatures between 300° and 500° C. and reduced in a current of hydrogen at temperatures between 400° and 450° C. The catalysts obtained in this manner are suitable for the hydrogenation of hydrocarbons.

An object of the present invention is to make available a chromium-free catalyst for the hydrogenation of organic compounds, especially for the selective hydrogenation of furfural to furfuryl alcohol.

Another object of the invention is to make a catalyst with improved specific catalytic activity over the known chromium-free catalysts and which can hydrogenate furfural to furfuryl alcohol with elevated selectivity and an improved yield.

SUMMARY OF THE INVENTION

In achieving the above and other object, one feature of the invention resides in a formed copper catalyst containing an intimate mixture of copper and pyrogenic silica. The catalyst is characterized in that the average size of the copper crystallites determinable by X-ray diffraction is between 5 and 50 nm, and the copper content relative to the total weight of the catalyst is between 10 and 70% by weight. The catalyst optionally also contains up to 15% by weight of a basic oxide.

Another feature of the invention resides in a method of making the catalyst wherein the pyrogenic silica, the precursor compound of the copper and optionally the precursor compound of the basic oxide are intensively kneaded and homogenized together in a kneader apparatus with the addition of water, processing aids and pore formers as needed. The kneading is carried out for a sufficient period of time and at such intensity to produce a plastic mass that can be readily extruded in conventional extruder apparatus to form extrudates having dimensions of 3 to 6 mm in diameter by 3 to 10 mm in length, for example. And more particularly, the process uses pyrogenic silica with a surface area (BET) of between 50 to 400 $m^2/g$ and the extrudates are calcined at temperatures in the range of 500° C., preferably 600° C. to 900° C. Finally, they are subjected to gas phase reduction at 250°–350° C.

BRIEF DESCRIPTION OF DRAWINGS

The present invention will be further understood with reference to the drawings, wherein.

DETAILED DESCRIPTION OF INVENTION

Figure 1:
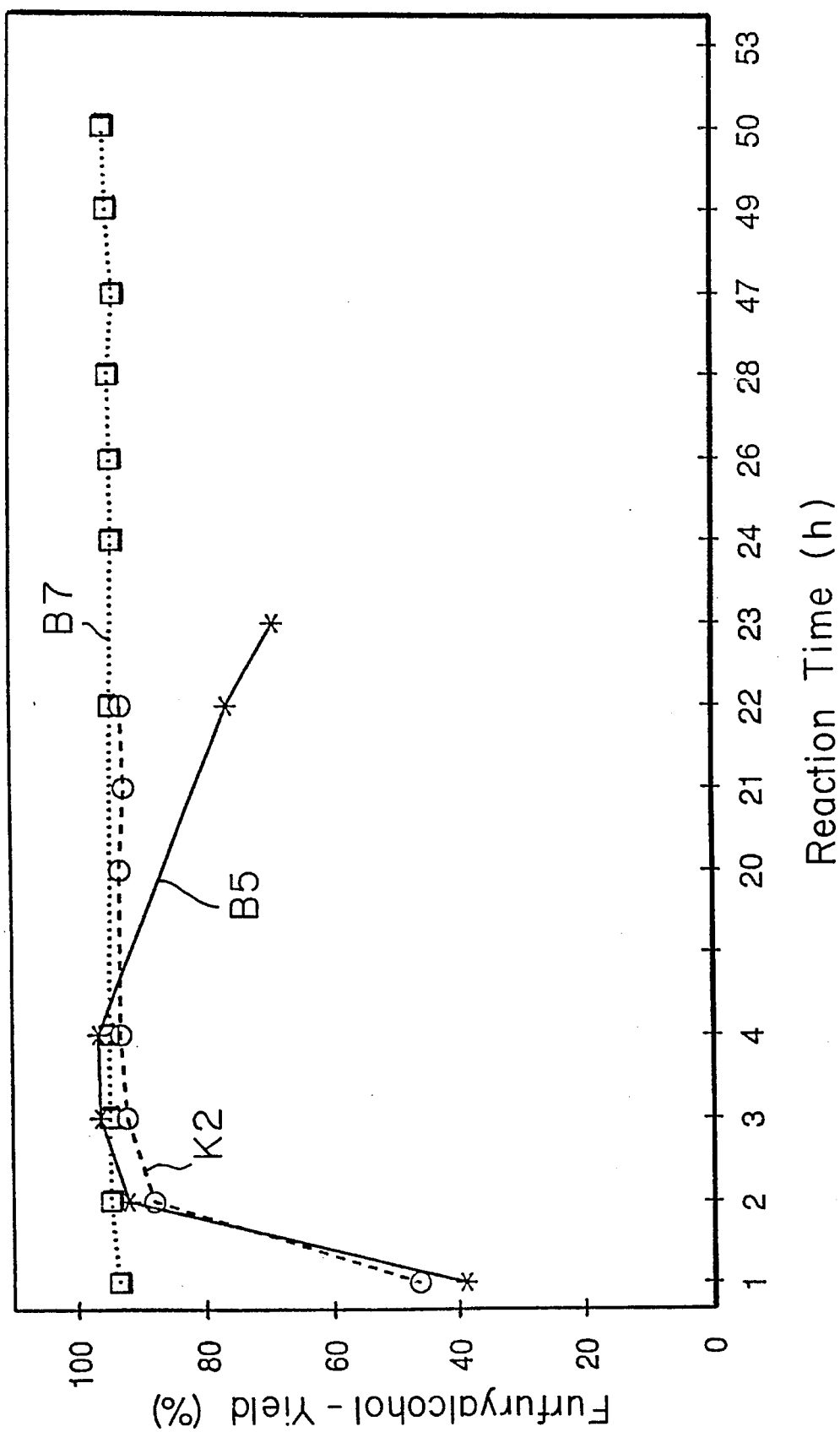
FIG. 1 is a graph of data showing yield versus reaction time at a given space velocity.

The physico-chemical properties of pyrogenic silicas are described in detail in the publication series identified as Pigments, Number 1: Bases of AEROSIL of Degussa AG. These products are well known in the art.

Pyrogenic silicas are obtained by flame hydrolysis from silicon tetrachloride by procedures well known in the art. They are distinguished by extreme fineness and correspondingly high specific surfaces, very high purity, spherical particle shape and a lack of pores. Their average primary particle size can be adjusted between approximately 7 nm and 40 nm. Their specific surface area varies accordingly between approximately 50 and 400 $m^2/g$. Surface area measurements are according to the BET method.

Pyrogenic silicas exhibit an X-amorphous structure. This structure remains even after days of being calcined at 1000° C. whereas customary precipitation silicas crystallize completely after only 20 minutes at the same temperature. It is known that the temperature resistance of pyrogenic silicas can be further increased by the addition of zirconium oxide.

DE-OS 39 12 504 describes the formation of extremely fine, pyrogenic silicas into shaped bodies which are suitable as catalytic carriers. According to this patent application, for the formation process, the pyrogenic silicas are homogenized with urea, methyl cellulose and/or magnesium stearate, graphite, aluminum stearate with the addition of water, and then dried at a temperature of 80° to 120° C. The resulting product is then comminuted to a powder, and the resulting powder is pressed into compacts and then calcined for a period of 0.5 to 8 hours at a temperature of 400° to 1200° C.

In order to produce the catalysts of the invention the pyrogenic silica, the precursor compound of the copper and optionally the precursor compound of the basic oxide together with reformation aids and pore formers are intensively kneaded and homogenized in a kneader apparatus with the addition of water to produce a sufficiently kneaded mass suitable for extrusion. The plastic catalytic mass obtained in this manner is subsequently compacted with an extruder and extruded to form extrudates with diameters of 3 to 6 mm and lengths of 3 to 10 mm. Any suitable conventional extruding apparatus can be used for this purpose as will be apparent to the skilled worker.

Suitable precursor compounds of copper for the production of the catalysts in accordance with the present invention are copper carbonate, copper acetate and copper(II) oxide. Sodium silicate, lithium hydroxide, sodium hydroxide and magnesium oxide can be used as the optional basic oxide or as its precursor compounds. Suitable-processing aids and pore formers are ammonia, monoethanol amine, urea, magnesium stearate, polyethylene oxide and methyl cellulose which are volatilized at calcination temperatures. Such processing aids and pore. formers are well known in the art and are used herein for their expected function.

The extrudates are dried at 70° to 120° C. for a period of approximately 12 hours. Any suitable drying apparatus can be used for this purpose. This is followed by a high temperature treatment or calcining for the decomposition and combustion of the deformation aids and pore formers. Temperatures of 250° to 350° C. are sufficient for this purpose. However, in order to impart sufficient fracture strength to the formed bodies it is recommended that the formed bodies be calcined for a period of approximately 3 hours at temperatures between 500 and 900, preferably between 600° and 750° C.

The calcining is followed by an approximately two-hour gaseous-phase reduction of the copper compounds contained in the catalytic formed bodies at temperatures of approximately 250°–350° C. Pure hydrogen gas or forming gas of 95% by volume nitrogen and 5% by volume hydrogen can be used as reducing agent. Forming gas is preferably used. The reduction with forming gas results in catalysts with a higher catalytic activity.

If the catalytic material is to be processed into tablets, it is recommended that extrudates be produced from the kneaded catalytic mass, also only with an extruder. After the extrudates have been dried they are ground, moistened and then tabletted using conventional tabletting equipment. The tabletting is followed by the above-described calcining and reduction of the catalytic tablets.

The finished catalysts exhibit bulk densities between 300 and approximately 800 g/l in accordance with their copper content and external form. Their pore volume is between 0.5 and 1.5 ml/g and is composed of meso- and macropores. Micropores with diameters below 2 nm can not be determined. The fracture strength of the finished catalytic bodies is approximately 40 to 65 N and therefore guarantees a low abrasive wear during the execution of the hydrogenation reactions and during any necessary regeneration cycles.

The average size of the copper crystallites determinable with X-ray diffraction is between 5 and 50 nm for the catalysts of the invention. The crystallite size present in the finished catalysts is a function of the calcining and reducing conditions selected and of the copper contents. The higher the calcining temperature and/or the longer the catalysts are calcined and the higher the copper content is selected to be, the larger the copper crystallites become.

The optimum crystallite size for the particular requirement profile (type of catalytic reaction, desired conversion and selectivity, necessary stability of the catalytic activity under the reaction conditions used) can be determined by an expert in the art with a few orienting tests.

The catalysts of the invention can be generally used for the hydrogenation of organic compounds. They are especially suited for the selective hydrogenation of furfural to furfuryl alcohol if their copper content is between 25 and 50% by weight, relative to the total weight of the catalysts, and if a sodium silicate is used as basic oxide with a weight amount in the catalyst of between 1–5% by weight.

The catalytic properties of the catalysts of the invention were therefore determined in the hydrogenation of furfural to furfuryl alcohol and compared with the properties of catalysts of the state of the art.

In further description of the drawings, FIG. 1 shows the graphic relationship between the yield of furfuryl alcohol as a function of the operating time of the catalytic bed for 3 different catalysts at a space velocity LHSV=0.5 h$^{-1}$ in accordance with the invention.

Figure 2:
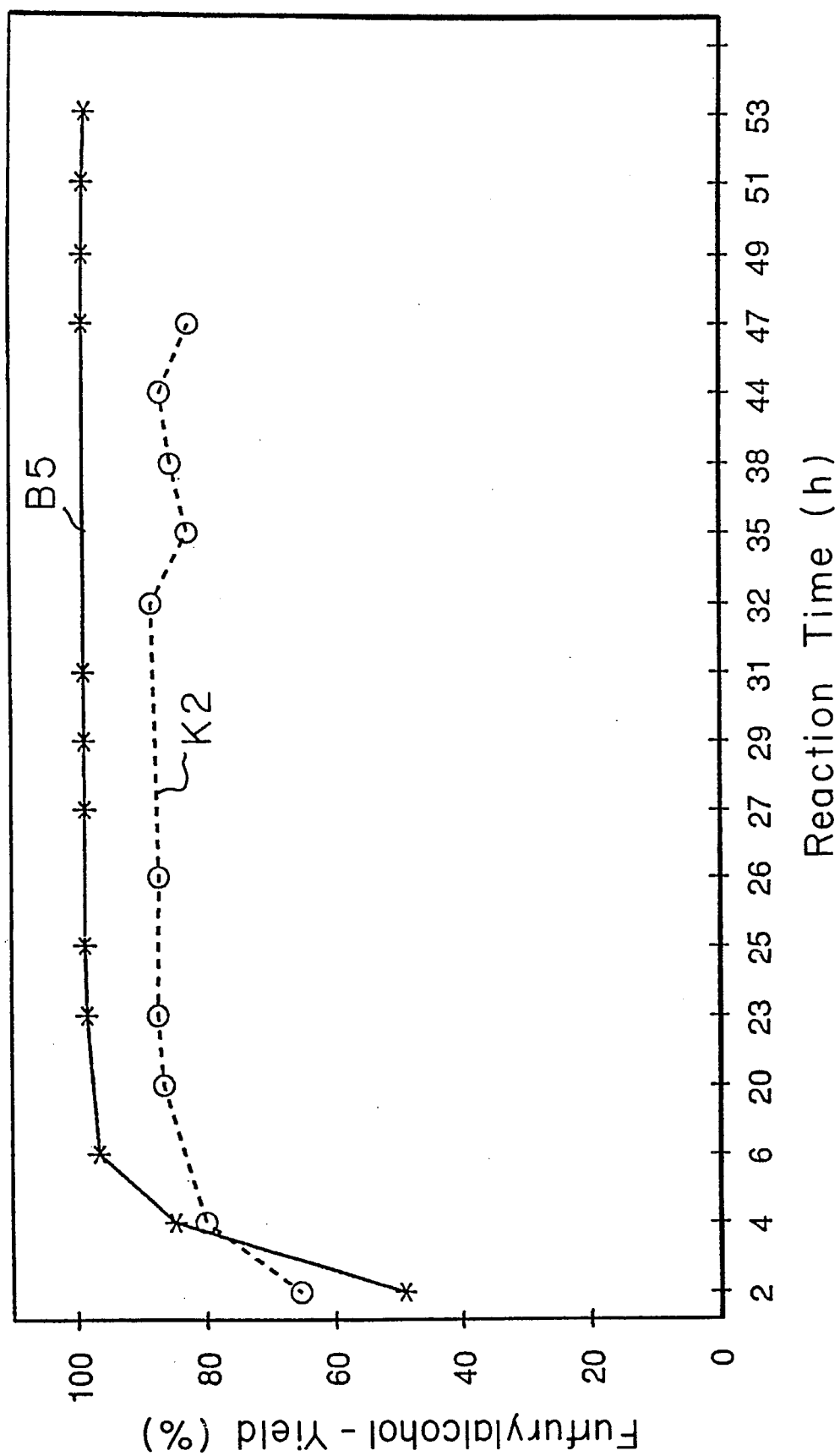
FIG. 2 is a graph of data showing yield versus reaction time at a different space velocity.

FIG. 2 shows the graphic relationship between the yield of furfuryl alcohol as a function of the operating time of the catalytic bed for 2 different catalysts at a space velocity LHSV=0.2 h$^{-1}$ in accordance with the invention.

In the examples pyrogenic silica was used as the carrier material for the catalysts of the invention and various precipitation silicas and diatomaceous earth were used as carrier material for producing reference catalysts in accordance with the state of the art. The physico-chemical data of these materials before processing to form the catalytic bodies are cited in table 1.

TABLE 1

Properties of the carrier materials before formation of catalytic bodies

| Material | SiO$_2$ content[5] (%) | BET surface (m$^2$/g) | Average Particle size | pH |
| --- | --- | --- | --- | --- |
| Pyrogenic silica (Aerosil 200; Degussa) | >99.8 | 200 | 12 nm[1] | 3.6–4.3[3] |
| Precip. silica 1 (FK 700; Degussa) | 99 | 700 | 15 μm[2] | 7[4] |
| Precip. silica 2 (Durosil; Degussa) | 98 | 60 | 15 μ[2] | 9[4] |
| Dia. earth (Claroel 78; Elf-Atochem) | 90 | 60 | 11 μm | 4–6 |

[1] Size of the primary particles
[2] Size of the agglomerates
[3] in 4% aqueous dispersion (according to DIN 53200)
[4] in 5% aqueous dispersion
[5] measured after annealing at 1000° C. for 2 hours Aside from example 1 all catalysts were produced analogously to U.S. Pat. No. 4,185,022 with copper carbonate as the precursor compound for copper. In the examples, in which a basic oxide was added as a promotor of the catalytic mass, sodium silicate in a weight amount in the catalytic mass of 2.2 by weight and 4.4% by weight was used.

The attempt to produce comparative catalysts on a carrier of pumice according to example 1 of U.S. Pat. No. 4,185,022 failed on account of the fact that pumice with a specific surface of at least 60 m$^2$/g was not able to be obtained. The specific surfaces of commercial pumice grades are in a range of 1 to 2 m$^2$/g.

EXAMPLE 1

In order to produce catalysts in accordance with the invention with a copper content of 12.5% by weight 250.0 g pyrogenic silica
112.2 g copper acetate $(Cu(CH_3COO)_2 \cdot H_2O)$
16.0 g urea
40.0 g monoethanol amine
22.5 g magnesium stearate and
60.0 g methyl cellulose were kneaded together with the addition of water in a conventional kneader apparatus to form a kneaded plastic mass and subsequently extruded in extrudates of 4 mm long and 3.3 mm in diameter. The extrudates were then calcined in a furnace at 800° C. for 3 hours and then subjected to reducing conditions at a temperature of 350° C. for one hour under a current of forming gas (95% by volume $N_2$+5% by volume $H_2$). The finished catalysts contained 12.5% by weight copper, remainder $SiO_2$.

Comparative Example 1

250.0 g precipitation silica 1 and
62.1 g copper carbonate $(CuCO_3 \cdot Cu(OH)_2)$ were processed together with urea, magnesium stearate and methyl cellulose as in example 1 to catalysts with 12.5% by weight copper.

Comparative Example 2

250.0 g precipitation silica 2 and
62.1 g copper carbonate were processed together with urea, magnesium stearate and methyl cellulose as in example 1 to form catalysts with 12.5% by weight copper.

EXAMPLE 2

250.0 g pyrogenic silica
149.5 g copper carbonate
21.5 g sodium silicate (as 35.35% water glass solution)
1.0 g polyethylene oxide and
60.0 g methyl cellulose were processed as in example 1 to form catalysts in accordance with the invention with 25% by weight copper and 2.2% by weight sodium silicate.

Comparative Example 3

250.0 g diatomaceous earth
149.5 g copper carbonate and
21.5 g sodium silicate were processed together with polyethylene oxide and methyl cellulose as in example 2 to form extruded catalysts with 25% by weight copper and 2.2% by weight sodium silicate.

EXAMPLE 3

250.0 g pyrogenic silica
145.0 g copper carbonate and
2.0 g polyethylene oxide were kneaded together with the addition of water in a kneader of conventional type to form a kneaded plastic mass and subsequently extruded to form extrudates 5 mm long and 5 mm in diameter. The extrudates were calcined and reduced as in example 1. The finished catalysts contained 25% by weight copper.

EXAMPLE 4

250.0 g pyrogenic silica
149.5 g copper carbonate
21.5 g sodium silicate and
2.0 g polyethylene oxide were processed as in example 3 to form catalysts. In contrast to the previous examples, in this one and in the following examples the temperature during calcining was lowered from 800° C. to 700° C. The finished catalysts contained 25% by weight copper and 2.2% by weight sodium silicate.

EXAMPLE 5

250.0 g pyrogenic silica
149.5 g copper carbonate
21.5 g sodium silicate and
2.0 g polyethylene oxide were extruded to form catalytic bodies 4 mm long and 3.3 mm in diameter, calcined and reduced analogously to example 4. The finished catalysts contained 25% by weight copper and 2.2% by weight sodium silicate.

EXAMPLE 6

250.0 g pyrogenic silica
149.5 g copper carbonate
21.5 g sodium silicate
0.75 g polyethylene oxide
6.75 g magnesium stearate and
5.0 g methyl cellulose were kneaded with the addition of water in a kneader to a plastic mass and subsequently extruded to form extrudates 4 mm long and 3.3 mm in diameter and then dried. The dried extrudates were then ground to produce a free flowing powder and pressed with a tabletting machine into tablets 5 mm in diameter and 5 mm high. Calcining and reduction took place in accordance with example 4. The finished catalysts contained 25 by weight copper and 2.2% by weight sodium silicate.

EXAMPLE 7

250.0 g pyrogenic silica
455.0 g copper carbonate
32.6 g sodium silicate and
2.0 g polyethylene oxide were processed as in example 4 to form catalysts. The finished catalysts contained 50% by weight copper and 2.2% by weight sodium silicate.

EXAMPLE 8

250.0 g pyrogenic silica
455.0 g copper carbonate
32.6 g sodium silicate
2.0 g polyethylene oxide
18.0 g magnesium stearate and
13.0 g methyl cellulose were processed as in example 6 to form catalysts. The finished catalysts contained 50% by weight copper and 2.2% by weight sodium silicate.

EXAMPLE 9

250.0 g pyrogenic silica 477.0 g copper carbonate 68.2 g sodium silicate 2.0 g polyethylene oxide 18.0 g magnesium stearate and 13.0 g methyl cellulose were processed as in example 6 to form catalysts in tablet form. The finished catalysts contained 50% by weight copper and 4.4% by weight sodium silicate.

EXAMPLE 10

Tablet-shaped catalysts were produced as described in example 9 with 50% by weight copper and 4.4% by weight sodium silicate. However, the reduction of the catalysts was not carried out using forming gas but rather using pure hydrogen.

EXAMPLE 11

0.0 g pyrogenic silica 5.3 g copper carbonate 56.0 g sodium silicate 2.0 g polyethylene oxide 18.0 g magnesium stearate and 13.0 g methyl cellulose were processed as in example 6 to form catalytic tablets. The finished catalysts contained 70% by weight copper and 2.2% by weight sodium silicate.

The composition of the catalysts produced according to the above examples as well of two commercially available copper chromite catalysts K1 and K2 is given in table 2. Table 2 also contains the dimensions as well as the measured bulk densities of the formed bodies.

Table 3 contains the specific surface area measured on the finished catalysts (determined according to DIN 66131 with nitrogen), the pore volume (according to DIN 66 133 with mercury intrusion at 4000 bar pressure) and the fracture strength. The fracture strength was determined with the fracture-strength tester of the Erweka company, type TBH 28, in axial direction.

The concepts micro-, meso- and macropores were selected in table 3 in agreement with the definitions of the IUPAC. According to these definitions the pore groups comprise the following diameter ranges:

Micropores: d<2 nm

Mesopores: d=2 . . 50 nm

Macropores: d>50 nm

TABLE 3

| | Physical properties of the finished catalytic bodies | | | | |
|---|---|---|---|---|---|
| | BET surface | Pore volume (ml/g) | | | Fracture Strength |
| Example | ($m_2$/g) | meso | macro | total | (N) |
| E1 | 129 | 0.63 | 0.17 | 0.80 | 56 |
| E2 | 10–15 | 0.05 | 0.89 | 0.94 | 38 |
| E4 | 71 | 0.42 | 0.98 | 1.40 | 63 |
| E5 | 71 | 0.14 | 0.82 | 0.96 | 41 |
| E6 | 85 | 0.30 | 0.82 | 1.12 | 41 |
| K1 | 180–240 | 0.30 | 0.49 | 0.79 | 28 |
| K2 | 40 | — | — | — | 125 |

Only meso- and macropores are detected with the mercury intrusion according to DIN 66 133; however, control measurements by adsorption of the nitrogen adsorption isotherms showed that the catalytic formed bodies of the invention exhibit practically no micropores.

EXAMPLE 12

The catalysts of table 2 were compared with each other as regards their performance data in the selective gaseous-phase hydrogenation of furfural to furfuryl alcohol. The hydrogenations were carried out in a continuous manner in a tubular reactor with an inside diameter of 2.54 cm and a length of 38.5 cm.

TABLE 2

| | | | Composition of the catalysts | | | | |
|---|---|---|---|---|---|---|---|
| Example No. | Carrier | Copper precursor | Copper content (%) | Na silicate (% by weight) | Form | Dimensions | Bulk Density g/l |
| E1 | pyr. silica | Cu—Acetate | 12.5 | — | Tablet | 5 × 5 | 445 |
| CE1 | ppt. silica | Cu—Carbonate | 12.5 | — | Extrudate | 4 × 3.3 | 355 |
| CE2 | ppt. silica | Cu—Carbonate | 12.5 | — | Tablets | 5 × 5 | 1080 |
| E2 | pyr. silica | Cu—Carbonate | 25.0 | 2.2 | Extrudate | 4 × 3.3 | 410 |
| CE3 | dia. earth | Cu—Carbonate | 25.0 | 2.2 | Extrudate | 4 × 3.3 | 450 |
| E3 | pyr. silica | Cu—Carbonate | 25.0 | — | Extrudate | 5 × 5 | 325 |
| E4 | pyr. silica | Cu—Carbonate | 25.0 | 2.2 | Extrudate | 5 × 5 | 370 |
| E5 | pyr. silica | Cu—Carbonate | 25.0 | 2.2 | Extrudate | 4 × 3.3 | 410 |
| E6 | pyr. silica | Cu—Carbonate | 25.0 | 2.2 | Tablet | 5 × 5 | 360 |
| E7 | pyr. silica | Cu—Carbonate | 50.0 | 2.2 | Extrudate | 4 × 3.3 | 480 |
| E8 | pyr. silica | Cu—Carbonate | 50.0 | 2.2 | Tablet | 5 × 5 | 494 |
| E9 | pyr. silica | Cu—Carbonate | 50.0 | 4.4 | Tablet | 5 × 5 | 550 |
| E10[1)] | pyr. silica | Cu—Carbonate | 50.0 | 4.4 | Tablet | 5 × 5 | 550 |
| E11 | pyr. silica | Cu—Carbonate | 70.0 | 2.2 | Tablet | 5 × 5 | 766 |
| K1 | copper chromite | copper chromite | 22% CuO | | Extrudate | 3.8 × 2–10 | 475 |
| K2 | copper chromite | copper chromite | 30.0 | | Extrudate | 3.3 × 3 | 1680 |

E: Example

CE = Comparative example

Dimensions are d × h (mm × mm)

K1: Commercial catalysts (Merck; 818859)

K2: Commercial catalysts (Engelhard; Cu-1132)

[1)]Corresponds to B9 but was reduced in pure hydrogen

The catalytic charge of the reactor was 40 ml in a fixed bed. Furfural was supplied with an HPLC pump to an evaporator, evaporated, mixed with hydrogen gas and conducted over the catalytic bed. The temperatures of evaporator, reactor and catalytic bed were regulated.

The hydrogenation parameters of pressure, temperature and $H_2$/furfural ratio determine the type of hydrogenation (gaseous-phase hydrogenation or trickle-bed hydrogenation). In the case of low pressures, high temperature and large $H_2$/furfural ratio the hydrogenation is a gaseous-phase reaction. The boiling points of furfural and furfuryl alcohol are approximately 161.7° C. and 171° C. under normal conditions. The furfural used for the tests had the following quality:

| Furfural G.C. assay | 99.4 (%) |
|---|---|
| Acidity | 0.012 (eq/l) |
| Moisture content | 0.05 (by weight) |
| Residue | 0.18 (by weight). |

The catalyst tests were carried out at a space velocity LHSV (liquid hourly space velocity) of 0.5 $h^{-1}$. The volume of the liquid furfural delivered by the HPLC pump and the volume of the catalytic bed were used to calculate the space velocity. The temperature of reactor and catalytic bed was adjusted to 170° C. and the gas pressure in the reactor to 3 bar.

The performance data of the catalysts was determined in each instance after a start-up phase of 4 hours by GC analysis of the liquid product. The results are cited in tables 4 and 5. They contain the conversions, selectivities and yields achieved with the particular catalysts as well as the specific catalytic activity in grams of the product (furfuryl alcohol) per hour and grams catalyst or in grams of the product per hour and milliliters catalyst.

The second definition of the specific catalytic activity is especially important as it permits a statement to be made about which volume must be made available for the catalytic bed in an industrial hydrogenation apparatus in order to assure a desired productivity (grams furfuryl alcohol per hour).

TABLE 4

Selective hydrogenation of furfural in the gaseous phase to furfuryl alcohol
T = 170° C.; LHSV = 0.5 $h^{-1}$; $H_2$:furfural = 5:1

| Example No. | Conversion (%) | Specific Catalytic Activity | | Selectivity (%) | Yield (%) |
|---|---|---|---|---|---|
| | | g product h × g Cat. | g product h × ml Cat. | | |
| E1 | 54.0 | 0.711 | 0.315 | 97.8 | 52.9 |
| CE1 | 17.5 | 0.270 | 0.096 | 99.7 | 17.5 |
| CE2 | 21.4 | 0.115 | 0.124 | 94.9 | 20.3 |
| E2 | 78.9 | 1.099 | 0.448 | 99.2 | 78.3 |
| E3 | 57.8 | 1.040 | 0.337 | 99.0 | 57.2 |
| CE3 | 21.8 | 0.277 | 0.125 | 76.1 | 16.6 |

Table 4 contains the comparison of the results of catalysts which were calcined at 800° C. Table 4 shows that catalyst E1 of the invention is far superior to comparison catalysts CE1 and CE2 as regards conversion and yield. The same applies to the specific catalytic activity. All three catalysts were produced without the addition of a promotor. Catalysts E2, E3 and CE3 exhibit a copper content of 25% by weight each. In addition, E2 and CE3 contain 2.2% by weight sodium silicate as promotor. Catalyst E3, on the other hand, contains no promotor. In spite of lacking a promotor, catalyst E3 is still far superior to the reference catalyst. Promoted catalyst E2 exhibits considerably better data.

Table 5 contains the results of the hydrogenations for the catalysts of the invention of examples E4 to E7 as well as for the two commercial catalysts K1 and K2. Catalysts E4 to E7 were made without the basic reformation aids urea and monoethanol amine and calcined only at 700° C. These measures resulted in a significant increase of the catalytic activity.

Catalysts E4 to E6 exhibit somewhat lower conversions than catalyst K2 does. However, this disadvantage was able to be completely compensated for by elevating the copper content from 25% by weight to 50% by weight in the case of the catalysts according to example E7. The specific catalytic activity per gram catalyst for all catalysts in accordance with the invention is up to 5 times greater than the activity of the best commercial catalyst K2.

If the catalytic activity is not related to the total weight of the catalysts but rather only to the copper content, the catalytic activity of the catalysts of example E7 increases over that of K2 by a factor of 2 on account of the differing bulk densities. Catalysts E7 therefore have a 7 times greater activity (2×1,195/0.333) given the same amount of copper in the catalytic bed than catalysts K2 do. Moreover, the catalysts of the invention exhibit significantly improved selectivities and yields.

The fact is also especially important in this connection that the specific activity of the catalysts of the invention, which activity is related to the catalyst volume, is almost identical to the values of copper chromite catalysts K1 and K2. Thus, the catalysts of the invention do not require larger reactors for the same productivity.

TABLE 5

Selective hydrogenation of furfural in the gaseous phase to furfuryl alcohol
T = 170° C.; LHSV = 0.5 $h^{-1}$; $H_2$:furfural = 5:1

| Example No. | Conversion (%) | Specific Catalytic Activity | | Selectivity (%) | Yield (%) |
|---|---|---|---|---|---|
| | | g product h × g cat. | g product h × ml cat. | | |
| E4 | 96.4 | 1.492 | 0.552 | 98.2 | 94.7 |
| E5 | 98.4 | 1.369 | 0.561 | 98.3 | 96.7 |
| E6 | 98.9 | 1.568 | 0.566 | 97.0 | 95.9 |
| E7 | 99.6 | 1.195 | 0.576 | 96.9 | 96.5 |
| K1 | 98.6 | 1.184 | 0.560 | 79.2 | 78.1 |
| K2 | 99.3 | 0.333 | 0.559 | 93.8 | 93.2 |

Table 6 contains the results of the hydrogenations for the catalysts of examples E8 to E 11 in accordance with the invention.

TABLE 6

Selective hydrogenation of furfural in the gaseous phase to furfuryl alcohol
T = 170° C.; LHSV = 0.5 $h^{-1}$; $H_2$:furfural = 5:1

| Example No. | Conversion (%) | Specific Catalytic Activity | | Selectivity (%) | Yield (%) |
|---|---|---|---|---|---|
| | | g product h × g cat. | g product h × ml cat. | | |
| E8 | 96.6 | 1.098 | 0.542 | 96.8 | 93.4 |
| E9 | 96.6 | 1.009 | 0.572 | 97.4 | 94.0 |
| E10[1] | 92.6 | 0.973 | 0.558 | 98.4 | 91.1 |
| E11 | 99.4 | 0.585 | 0.448 | 78.7 | 78.2 |

[1] The catalysts were reduced in pure hydrogen, otherwise they are identical to the catalysts of E9.

Table 6 shows that the doubling of the sodium silicate content from 2.2% by weight (catalysts according to E8) to 4.4% by weight (catalysts according to E9) increases the selectivity of the catalysts so that a higher yield results at the same conversion.

In distinction to all other catalysts, the catalysts according to E10 were not reduced with forming gas but rather with pure hydrogen. The reduction in pure hydrogen reduces the achievable conversion by 4% in comparison to the catalysts reduced with forming gas according to example 9. Therefore, in spite of a slightly increased selectivity of the catalysts reduced with pure hydrogen gas the yield which can be achieved with them is also reduced.

The catalysts of example 11 exhibit the highest conversion (99.4%) on account of their high copper content (70% by weight). However, their selectivity is considerably reduced in comparison to the catalysts with lower copper contents. The sodium silicate content can be increased in order to improve their selectivity, as is shown in example 9.

EXAMPLE 13

The catalysts of examples E5, E7 and copper chromite catalysts K2 were subjected to a long-time test at a charge with a space velocity LHSV of 0.5 $h^{-1}$. The results of this long-time test are shown in table 7 and in FIG. 1. The catalysts of example E5 initially show a very high yield of furfuryl alcohol but deactivate significantly after 4 hours operating time already on account of the low copper content. On the other hand, the catalysts of example E7 with a copper content of 50% by weight even after 50 hours operating time still show no deactivation at all with a higher yield at the same time than with catalysts K2.

TABLE 7

Yield of furfuryl alcohol as a function of the operating time
(Gaseous-phase hydrogenation; T = 170° C.; LHSV = 0.5 $h^{-1}$)

| Operating Time | Yield (%) | | |
|---|---|---|---|
| | E5 | E7 | K2 |
| 1 | 38.9 | 93.5 | 46.2 |
| 2 | 92.1 | 94.9 | 88.1 |
| 3 | 96.4 | 95 | 92.3 |
| 4 | 96.7 | 95 | 93.2 |
| 20 | | | 93.2 |
| 21 | | | 92.4 |
| 22 | 76.4 | 94.5 | 92.9 |
| 23 | 69 | | |
| 24 | | 94.2 | |
| 26 | | 94.3 | |
| 28 | | 94.6 | |
| 47 | | 93.9 | |
| 49 | | 94.9 | |
| 50 | | 95.4 | |

EXAMPLE 14

The catalysts of example E5 and copper chromite catalysts K2 were subjected to an additional long-time test at a space velocity reduced to 0.2 $h^{-1}$. The results in table 8 and the graph in FIG. 2 show that at this decreased charge the catalysts of example E5 with only 25% by weight copper do not deactivate even after 53 hours operating time.

TABLE 8

Yield of furfuryl alcohol as a function of the operating time
(Gaseous-phase hydrogenation; T = 170° C.; LHSV = 0.2 $h^{-1}$)

| Operating Time | Yield (%) | |
|---|---|---|
| | E5 | K2 |
| 2 | 49.1 | 65.4 |
| 4 | 84.8 | 80.1 |
| 6 | 96.6 | — |

TABLE 8-continued

Yield of furfuryl alcohol as a function of the operating time
(Gaseous-phase hydrogenation; T = 170° C.; LHSV = 0.2 $h^{-1}$)

| Operating Time | Yield (%) | |
|---|---|---|
| | E5 | K2 |
| 20 | — | 86.5 |
| 23 | 98.4 | 87.4 |
| 25 | 98.7 | — |
| 26 | — | 87.2 |
| 27 | 98.7 | — |
| 29 | 98.8 | — |
| 31 | 98.8 | — |
| 32 | — | 88.3 |
| 35 | — | 82.6 |
| 38 | — | 85.1 |
| 44 | — | 86.7 |
| 47 | 98.8 | 82.4 |
| 49 | 98.8 | |
| 51 | 98.8 | |
| 53 | 98.5 | |

Further variations and modifications of the foregoing will be apparent to those skilled in the art and are intended to be encompassed by the claims appended hereto.

German priority application P 44 03 187.4 is relied on and incorporated herein by reference.

We claim:

1. A formed copper catalyst comprising an intimate mixture of copper and pyrogenic silica, wherein the copper is present as crystallites with an average size as determinable by X-ray diffraction between 5 and 50 nm, the copper content relative to the total weight of the catalyst is between 10 and 70% by weight.

2. The catalyst according to claim 1 further comprising up to 15% by weight of a basic oxide.

3. The catalyst according to claim 2 wherein the basic oxide is a member selected from the groups consisting of sodium silicate, lithium hydroxide, sodium hydroxide and magnesium oxide.

4. The catalyst according to claim 1 which is chromium free.

5. The catalyst according to claim 1 in the form of bodies with diameters of 3 to 6 mm and lengths of 3 to 10 mm.

6. The catalyst according to claim 1 in the form of tablets.

7. The catalyst according to claim 1 having a bulk density of 300 to 800 g/l.

8. The catalyst according to claim 1 having a pore volume of 0.5 to 1.5 ml/g composed of mesa and macropores.

9. The catalyst according to claim 1 having a fracture strength of 40 to 65 N.

10. The catalyst according to claim 1, wherein the copper content is between 12.5 and 50% by weight, relative to the total weight of the catalyst.

11. The catalyst according to claim 1 wherein the basic oxide is sodium silicate.

12. The catalyst according to claim 10 wherein the copper content is 25 to 50% by weight based on the total weight of the catalyst.

13. The catalyst according to claim 11 wherein the sodium silicate is present in an amount of 1 to 5% by weight of the catalyst.

14. A method of producing a chromium free formed copper catalyst containing an intimate mixture of copper, pyrogenic silica and, optionally, a basic oxide, with a copper content of the finished catalyst between 10 and 70% by weight and with a basic oxide content of up to 15% by weight, consisting essentially of kneading pyrogenic silica, precursor compounds of the copper as well as precursor compounds of the basic oxide together with a processing aid and a pore former with the addition of water to form a plastic catalytic mass, extruding the plastic catalytic mass to form extrudates, drying and calcining said extrudates and reducing the copper, wherein the pyrogenic silica exhibits a specific surface area (BET) of between 50 and 400 m$^2$/g and the extrudates are calcined at temperatures between 500° and 900° C.

15. The method according to claim 14 wherein said calcining is at between 600° and 900° C.

16. The method according to claim 15 further comprising subjecting said extrudates to a gaseous-phase reduction.

17. The method according to claim 16 wherein the temperature of said reduction is between 250° and 350° C.

18. The method according to claim 16, wherein the gaseous-phase reduction is carried out in pure hydrogen.

19. The method according to claim 16, wherein the gaseous-phase reduction is carried out in a mixture of nitrogen and hydrogen.

20. The method of using the catalyst in accordance with claim 1 for the selective hydrogenation of organic compounds, comprising subjecting an organic compound to hydrogen in the presence of the catalyst of claim 1.

21. A method for preparation of furfuryl alcohol comprising supplying furfural to an evaporation zone, evaporating the furfural to form a vapor thereof, mixing said vapor with hydrogen in the presence of a catalyst comprising an intimate mixture of copper and pyrogenic silica, wherein copper is present as crystallites with an average size as determinable by X-ray diffraction between 5 and 50 mm, the copper content relative to the total weight of the catalyst being 10 to 70% by weight, and recovering the product.

22. The method according to claim 21 wherein the ratio of hydrogen to furfural is 5 to 1.

23. A method of producing a chromium free formed copper catalyst containing an intimate mixture of copper, pyrogenic silica and, optionally, a basic oxide, with a copper content of the finished catalyst between 10 and 70% by weight and with a basic oxide content of up to 15% by weight, consisting of kneading pyrogenic silica, precursor compounds of the copper as well as precursor compounds of the basic oxide together with a processing aid and a pore former with the addition of water to form a plastic catalytic mass, extruding the plastic catalytic mass to form extrudates, drying and calcining said extrudates and reducing the copper, wherein the pyrogenic silica exhibits a specific surface area (BET) of between 50 and 400 m$^2$/g and the extrudates are calcined at temperatures between 500° and 900° C.

24. A chromium free formed copper catalyst comprising the catalyst produced by the method of claim 23.

* * * * *